United States Patent
Kussel

(10) Patent No.: US 6,983,926 B2
(45) Date of Patent: Jan. 10, 2006

(54) VALVE ARRANGEMENT FOR HYDRAULIC CONSUMER

(75) Inventor: Willy Kussel, Werne (DE)

(73) Assignee: Tiefenbach Bergbautechnik GmbH, Essen (DE)

( * ) Notice: Subject to any disclaimer, the term of this patent is extended or adjusted under 35 U.S.C. 154(b) by 0 days.

(21) Appl. No.: 10/998,453

(22) Filed: Nov. 29, 2004

(65) Prior Publication Data

US 2005/0098755 A1    May 12, 2005

Related U.S. Application Data

(63) Continuation of application No. PCT/DE03/01667, filed on May 23, 2003.

(30) Foreign Application Priority Data

May 28, 2002   (DE) .............................. 102 23 807

(51) Int. Cl.
*F15B 11/28*    (2006.01)

(52) U.S. Cl. .................. 251/325; 251/63; 251/63.5

(58) Field of Classification Search .............. 251/62, 251/63, 63.5, 324, 325
See application file for complete search history.

(56) References Cited

U.S. PATENT DOCUMENTS

| 4,401,293 A | * | 8/1983 | Rodewald et al. ........... 251/324 |
| 4,938,253 A | * | 7/1990 | Takeo et al. ................. 137/508 |
| 6,488,258 B1 | * | 12/2002 | Dantlgraber et al. ....... 251/63.6 |
| 2004/0061086 A1 | * | 4/2004 | Rodrigues .................. 251/63.5 |

FOREIGN PATENT DOCUMENTS

| GB | 151 839 A | 10/1920 |
| GB | 443 165 A | 2/1936 |
| GB | 940 901 A | 11/1963 |

* cited by examiner

*Primary Examiner*—J. Casimer Jacyna
(74) *Attorney, Agent, or Firm*—Alston & Bird LLP

(57) ABSTRACT

A check valve arrangement for a hydraulic consumer which permits connecting the hydraulic consumer selectively to a medium pressure line or a high pressure line. The valve arrangement comprises a medium pressure switching valve 10, a high pressure switching valve 14, and a check valve 6 downstream of these valves. The check valve 6 is constructed as a combined sliding and seat valve and comprises control surfaces 28, 29, 38 for the medium pressure P1, the high pressure P2, and the pressure applied to a consumer line 5, i.e., the pressure applied to the hydraulic consumer. The control surfaces are dimensioned such that a connection of the hydraulic consumer to the high pressure line can occur only when a predetermined limit pressure is reached in the hydraulic consumer.

11 Claims, 2 Drawing Sheets

VALVE ARRANGEMENT FOR HYDRAULIC CONSUMER

CROSS REFERENCE TO RELATED APPLICATION

The present application is a continuation of international application PCT/DE03/01667, filed 23 May, 2003, and which designates the U.S. The disclosure of the referenced application is incorporated herein by reference.

BACKGROUND OF THE INVENTION

The invention relates to a hydraulic consumer which comprises an arrangement of switching valves and check valves, and which permits selective connection of the consumer to a medium pressure line or a high pressure line. The selection of the lines may be controlled in an arbitrary or system-dependent manner, for example, by sensors.

It is common practice that such a hydraulic consumer is preceded by a hydraulically biased two-way valve in the consumer line, to which the high pressure line is applied on the one hand and the medium pressure line on the other hand. The hydraulically biased two-way valve ensures that the consumer line always receives the higher pressure, and that the connection from higher pressure to lower pressure is blocked.

The connection to lines which conduct differently high pressures, can be useful especially when the hydraulic consumer is a machine that has to meet different requirements. This applies in particular to hydraulic cylinder-piston units, which are used in mine development devices for supporting the shields in mining. Such mine development devices operate under a very high pressure. It is known to switch these mine development devices, for example, from a pressure of 300 bars to a pressure, hereafter medium pressure, of more than 300 bars. In this connection, the lower pressure is needed primarily for robbing and advancing the mine supports, as well as in the first phase of the setting step, when large volume flows must be switched (robbing=releasing and withdrawing the development unit; advancing=forward movement of the development unit; setting=positioning the development unit and its shields in the holding position). However, a high pressure is by all means avoided in the case of high volume flows because of the very great stress on the valves that is associated therewith. Primarily, however, the connection of high pressure in the operating phases, which proceed with a high volume flow, would lead to a collapse of the high pressure system.

It is therefore an object of the invention to improve the hydraulic consumer such that it can be applied to a medium pressure or a high pressure selectively, i.e., in an arbitrary or system-controlled manner, without risking a collapse of the high pressure source and the high pressure system, and without delivering large volume flows under a high pressure.

SUMMARY OF THE INVENTION

The above and other objects and advantages of the invention are achieved by the provision of a check valve arrangement for a hydraulic consumer which permits connecting a consumer line of the hydraulic consumer selectively to a medium pressure line or a high pressure line, with the check valve arrangement comprising a check valve having a housing which is connected to at least one medium pressure line, a high pressure line, and the consumer line.

A piston is mounted in the bore of the housing for slideable movement between (a) a flow position wherein the medium pressure line is open to the consumer line and the high pressure line is blocked, or (b) a blocking position wherein the medium pressure line is closed to the consumer line and the high pressure line is open to the consumer line. However, movement to the blocking position only occurs when a predetermined hydraulic limit pressure is present in the consumer line.

Accordingly, it is accomplished that the hydraulic consumer can be constantly operated via a medium pressure system, even when no high pressure is available, for example, because other consumers have priority. While the connection of high pressure is arbitrary or system-dependent, for example, and possible at any time upon request by sensors or by manual control, it can occur only under suitable conditions with respect to the operating state of the hydraulic consumer. Thus, a connection of high pressure at the wrong time with the risk of a collapse of the high pressure system is avoided.

With the use of this check valve, the valve piston thereof is kept in its flow position constantly, i.e., in all operating situations with one exception, so that a constant connection exists between the medium pressure line and the consumer line of the hydraulic consumer. The exceptional operating situation is present, on the one hand when high pressure is connected, and on the other hand when the check valve piston is also biased with the consumer pressure in the sense of a pilot control.

In this process the at least required limit pressure of the consumer, which causes the check valve piston to switch to its blocking position, is set so high that the connection of the high pressure to the consumer line does not cause any significant pressure drop in the high pressure system, and that it is likewise not necessary to move significant volume flows for increasing the pressure in the consumer.

The flow position can be attained and adjusted, for example, in that the check valve piston is biased by a force acting in the corresponding direction. Specifically, the piston is constantly biased by the medium pressure in a second medium pressure line. Thus the piston acts as a simple non-return valve that prevents an unintentional drop of the consumer under an extreme load, when the consumer is connected neither to the medium pressure nor to the high pressure. This enables a very sensitive constant control of the consumer with the aid of a medium pressure switching valve.

The further development of the invention wherein the pilot control surfaces and piston shoulders are formed on the circumference of the cylindrical check valve piston, favors the use of the check valve as a non-return valve with little flow resistance in the flow position. In this connection, the described embodiments of the invention are each configured with two pilot control surfaces on the check valve piston, which are operative in the direction of the blocking position, and which are biased on the one hand by the high pressure and on the other hand by the consumer pressure. These pilot control surfaces may likewise be formed on the circumference of the piston.

The piston includes a seat at one end which closes the medium pressure line in the blocking position of the seat, and the piston includes a face which serves as a consumer pressure control surface. This serves to simplify on the one hand the construction of the piston and to permit on the other hand larger flow cross sections, little flow resistance, and delivery of large volume flows without wear.

BRIEF DESCRIPTION OF THE DRAWINGS

In the following, embodiments of the invention are described with reference to the drawings, in which.

DETAILED DESCRIPTION OF THE PREFERRED EMBODIMENTS

Figure 1:
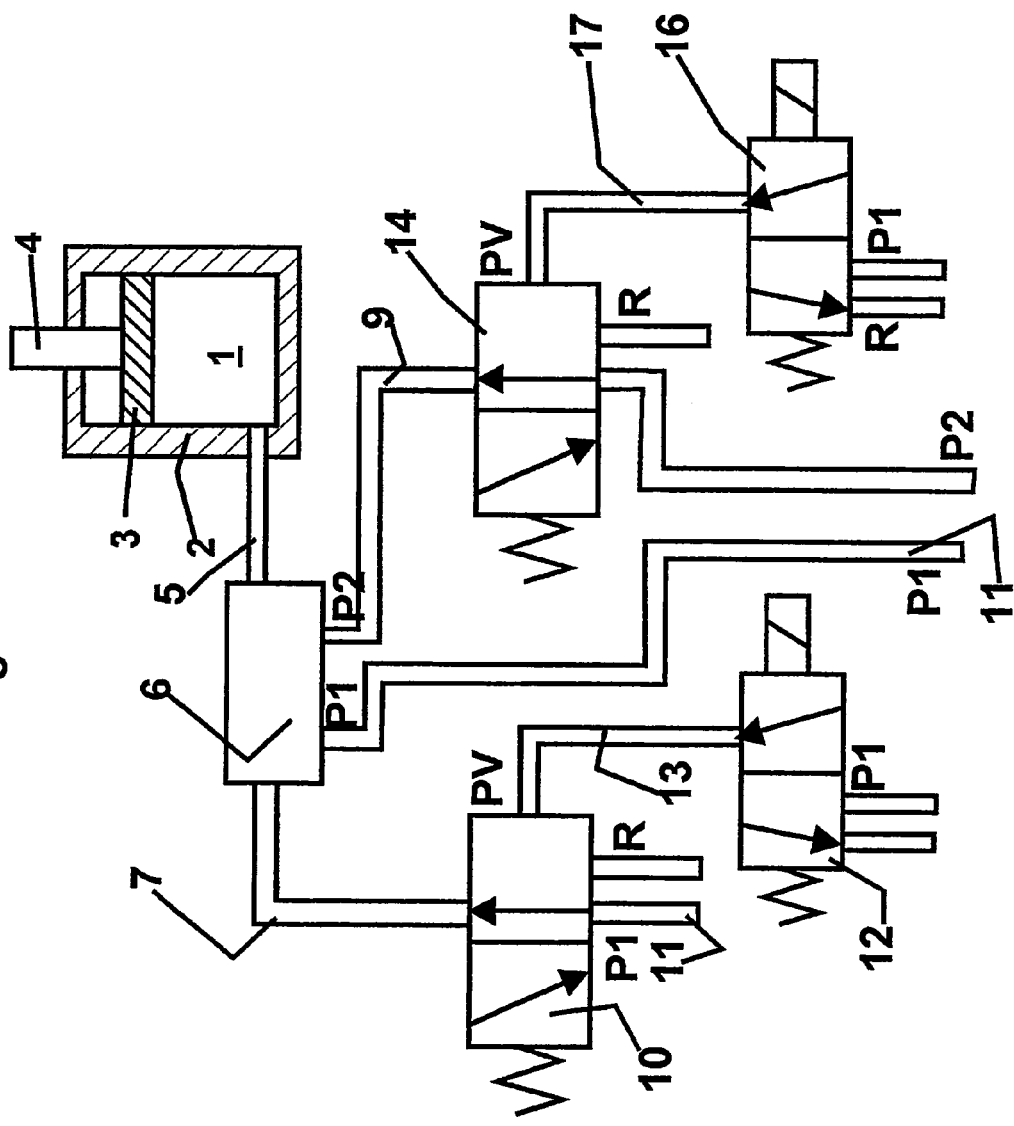
FIG. 1 is a view of the consumer in a hydraulic circuit.

As schematically shown, the hydraulic consumer is, for example, a cylinder-piston system 1 with a cylinder 2, a piston 3, and a plunger 4. The cylinder is biased with hydraulic pressure via a consumer line 5 for an upward movement by means of the illustrated switching and check valve system. It should be noted that for a downward movement, the respectively other cylinder chamber is provided with a corresponding consumer line and a corresponding valve system, which is not shown.

The consumer line 5 of the consumer may be connected via a two-way valve or check valve 6 to a medium pressure line 7 or a high pressure line 9. The medium pressure line has, for example, 300 bars, the high pressure line 400 bars. Pressure is supplied to the medium pressure line 7 at an average pressure P1 via a line 11 by means of a medium pressure switching valve 10. This valve is a 3/2 way valve. The valve 10 with its connections to medium pressure line 11, return flow line R, and line 7 is hydraulically biased by a pilot pressure PV in pilot line 13. The medium pressure switching valve 10 is activated by means of a medium pressure pilot valve 12. This valve is a 3/2 way valve with electromagnetic actuation. In this process, the medium pressure P1 is directed as pilot pressure PV to a medium pressure pilot line 13. As a result of this activation, the lines 11 and 7 are connected.

Preferably, the medium pressure switching valve 10 is constructed as a seat valve with a seat that blocks the connection from the pump line 11 to the consumer line 7 by the force of the pump pressure, when the valve is inoperative.

The high pressure P2 is connected to a high pressure line 9 by a high pressure switching valve 14. The valve is a 3/2 way valve, which is hydraulically biased by the pilot pressure PV in pilot line 17. For the pilot control, a high pressure pilot control valve is used, which permits connecting the high pressure pilot line 17 to the pump line P1. Likewise the high pressure pilot valve 16 is electromagnetically actuated and connected to the return line in its inoperative position. Preferably, the high pressure switching valve 14 is constructed as a seat valve with a seat that blocks in the inoperative position of the valve the connection between a pump line 15 conducting a high pressure P2 to the high pressure line 9 or the return flow line R.

The so-far described switching and check valve arrangement is realized such that the hydraulic consumer can be constantly operated by the medium pressure, except for an operating situation that is described in the following. In all operating situations, except the exceptional operating situation, the two-way check valve 6 provides for a resistance free connection between the medium pressure line 7 and the consumer line 5. Thus, by electromagnetically actuating the medium pressure pilot valve 12, the piston 3 and the plunger 4 are able to move upward. When electromagnetically actuating the corresponding pilot valve for the downward movement, which is not shown, the electromagnet of the pilot valve 12 releases. With that, the pilot valve 12 and the medium pressure valve 10 switch to the return flow position, so that the piston 3 is able to move downward. Likewise in this case, the two-way check valve 6 remains open.

One must now see that in the switching and check valve arrangement, the connection to the high pressure, i.e., the connection of the consumer line 5 to the high pressure line 9 is unable to occur at the wrong time, even upon corresponding actuation of the electromagnet of the high pressure pilot valve 16 and upon connection of the high pressure switching valve 14. A switching is possible only when a predetermined hydraulic limit pressure is at least reached in the consumer 1 or the consumer line 5. This hydraulic limit pressure is above the atmospheric pressure and lies substantially in a range, which is also covered by the medium pressure. The limit pressure is selected such that the biasing of the hydraulic consumer by the high pressure does not lead to excessive volume flows and to a collapse of the pressure in the high pressure system, and that it likewise causes no excessive wear of the valves. The limit pressure should not be below 100 bars, when otherwise an operation at 300 bars is desired.

In other words, the valves close. In the simplest case, this may occur in that a pressure sensor measures the pressure in the consumer, and that the electric actuation of the electromagnet for the high pressure pilot valve 16 is blocked as long as the limit pressure has not been reached. In the following, it will be described how the invention can be realized by a hydraulic solution. The following description of FIGS. 2 and 3 relates to a special configuration of the two-way check valve 6, which is integrated into the circuit according to FIG. 1. The following description will equally apply to FIGS. 2 and 3, unless express reference is made to differences.

Normally, a two-way valve comprises a valve piston, which is adapted for reciprocal movement between two pressure lines, and which respectively opens the line with the higher pressure to a discharge line and closes the line with the lower pressure. In the embodiments of the invention shown in FIGS. 2 and 3, a special configuration of the two-way valve is provided in such a manner that it is also able to assume a special function as a check valve relative to the high pressure line. The check valve 6 connects via the medium pressure line 7 to the medium pressure switching valve 10, and via the high pressure line 9 to the high pressure switching valve 14. A check valve piston 19 selectively connects the medium pressure line 7 or the high pressure line 9 to the consumer line 5.

Figure 2:
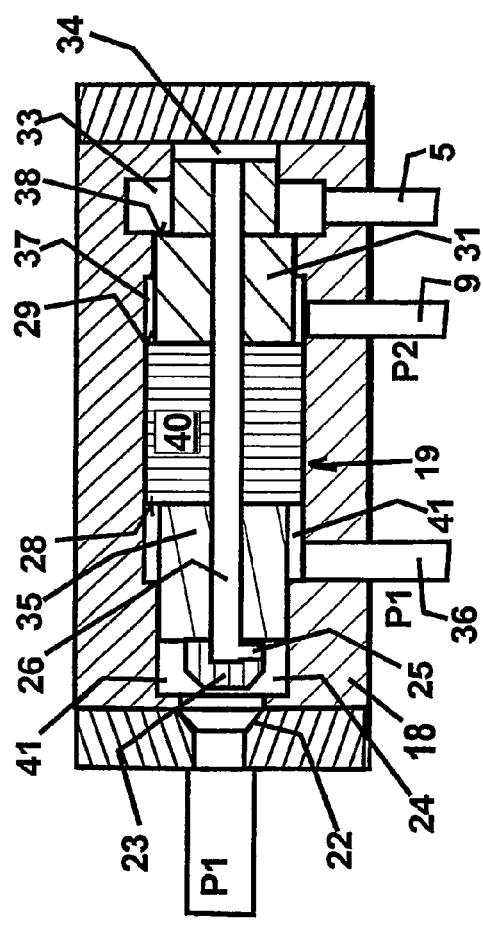
FIG. 2 is a view of an embodiment of a check valve.
Figure 3:
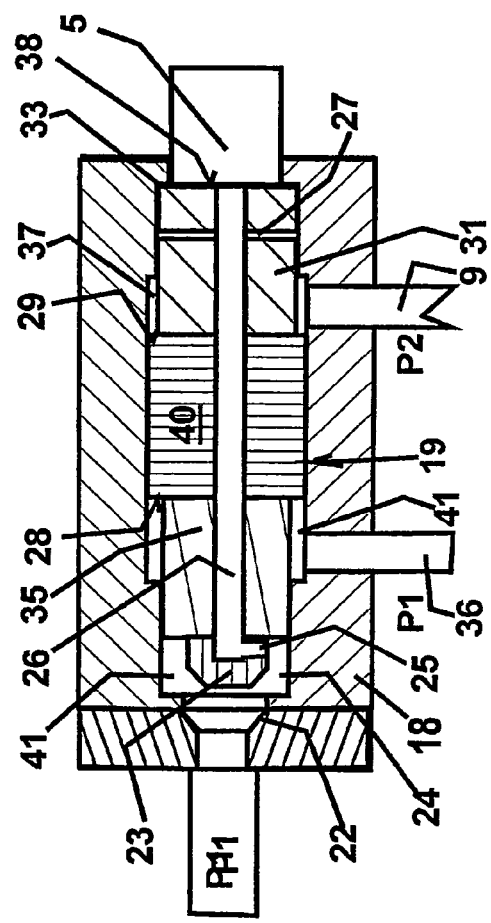
FIG. 3 is a view of a further embodiment of a check valve with a special configuration of the high pressure line.

At its one end, the check valve piston 19 mounts a seat member 23, which corresponds with an annular seat opening 22 in a valve housing 18. By moving the seat member 23 into the seat opening 22, an inlet chamber 24 of the valve housing is hermetically closed toward the medium pressure line 7. In the present application, this position, which is not shown, is called the blocking position. The opposite position, which is shown in FIGS. 2 and 3, is referred to as the flow position. In the flow position, the inlet chamber 24 of the valve housing 18 connects as much as possible free of resistance to the medium pressure line 7. Into the piston 19, a radial passageway 25 is drilled, which connects the inlet chamber 24 to a central piston bore 26, which extends along the axis of the piston. At the other end, the central bore 26 extends outward and communicates here with a consumer chamber 33, which is formed in the valve housing. The consumer chamber 33 is constantly connected to the consumer line 5 on the one side and to the inlet chamber 24 on the other side. This applies to the embodiment of FIG. 2.

In the embodiment of FIG. 2, the consumer line 5 branches off from the side of the valve housing 18. In this case, the consumer line 5 is adjacent to the high pressure line 9. On the end side facing away from the seat member 23, the check valve piston 19 comprises a cylindrical control shoulder 31. This control shoulder covers and closes the high pressure line 9 toward the consumer line 5, and with a peripheral edge on its face 38 it causes this line to open, when the check valve piston 19 moves to its blocking position, i.e. toward the left as seen in the drawing. A shoulder 32 at the piston end has a smaller diameter than the control shoulder 31. As a result, this piston shoulder 32 leaves on the control shoulder 31 an annular surface 38, which is referred to in the present application as a consumer pressure control surface. With this surface, the control shoulder 31 defines the consumer chamber 33 so that pressure in the chamber 33 tends to move the piston toward the blocking position of the check valve piston, and otherwise closes it toward the end of the valve housing.

At its end facing away from the blocking position, the valve housing forms an equalization chamber 34 that connects to the inlet chamber 24 via the central channel 26 and the passageway 25. Furthermore, between the seat member 23 and the control shoulder 31, the check valve piston 19 possesses a first shoulder 35, which is followed by a shoulder 40 with a larger diameter. The piston shoulder 35 defines a valve chamber 41 which is formed in the valve housing 18, and which serves as a medium pressure chamber and constantly receives the medium pressure (P1) via a line 36. The medium pressure chamber 41 is bounded toward the piston shoulder 40 by its face 28, which forms toward the piston shoulder 35 an annular surface, upon which the constantly applied medium pressure P1 is operative for the purposes of exerting a force in the direction of the flow position of the check valve piston 19.

On its other front face, the piston shoulder 40 forms toward the piston shoulder 31 an annular surface 29, which is exposed via the high pressure line 9 to the high pressure of the valve chamber 37 that is used as a high pressure chamber, provided the high pressure line 9 receives high pressure P2 via the high pressure switching valve 14. The high pressure acts upon the high pressure control surface 29 in the sense of a force that displaces the check valve piston toward its blocking position.

In this configuration of FIG. 2, a pilot control of the check valve piston 19 occurs as follows: On the intermediate piston shoulder 40 with an enlarged diameter, annular surfaces 28 and 29 are formed toward the adjacent piston shoulders 35 and 31. The annular surface 28 and the piston shoulder 35 form with the valve housing 18 a valve chamber 41, i.e., a medium pressure valve chamber, which constantly connects via the medium pressure supply line 36, see also FIG. 1, to the medium pressure P1. The pressure on the medium pressure face 28 acts upon the check valve piston 19 in the sense of a displacement to the flow position. The annular surface 29 adjacent the piston shoulder 31 forms with the valve housing 18 the chamber 37, which can be connected to the high pressure line 9.

As shown in FIG. 1, the high pressure line 9 is supplied with high pressure or released therefrom by means of high pressure switching valve 14 and pilot valve 16. The piston shoulder 31 is also provided with a consumer pressure control surface 38 which faces in the same direction as the annular surface 29. The annular surface 38 as well as the piston shoulder 32 on the end side and the valve housing 18 form the consumer chamber 33, which connects to the consumer line 5, as also shown in FIG. 1. The pressure applied to the high pressure control surface 29 and to this consumer pressure control surface 38 operates in the sense of displacing the check valve piston 19 toward its blocking position. The annular surfaces 28 on the one side, and the surfaces 29 and 38 on the other side, are dimensioned such that the medium pressure being applied to the medium pressure chamber 41 and the thereby exerted force in the sense of the flow position can be overcome only by applying high pressure to the counteracting annular surface 29, and that the piston 19 is pushed to its blocking position, when at the same time a certain limit pressure prevails on the annular surface 38, i.e., in the consumer line 5 and the consumer 1. This limit pressure may be equal to or smaller than the medium pressure. It is however greater than the atmospheric pressure, and in this respect it is randomly defined, when dimensioning the valve. It is as high as to permit switching the piston 19 to its blocking position, when the supply of high pressure to the high pressure line 9 no longer effects a significant volume flow in the direction of consumer 1.

The check valve of FIG. 3 differs from the previously described valve primarily in that the consumer line 5 is in alignment with the check valve piston 19. As a result, the central channel 26 in the check valve piston 19 constantly connects to the consumer line 5 of the consumer 1.

Also in this embodiment, the control shoulder 31 closes the high pressure chamber 37 with the high pressure line 9 in the flow position of the piston 19. The control shoulder 31 includes radial high pressure bores 27, which end in the central channel 26. In the blocking position of the valve piston 19, the high pressure bores 27 connect the high pressure valve chamber 37 to the central channel 26. Before reaching the blocking position, the high pressure bores 27 remain closed by the valve housing 18. In the present embodiment, the third pilot control surface 38, on which the consumer pressure is operative, is formed by the entire face of the piston 19 at the outlet end of the valve housing 18 to the consumer line 5. In this case, one must take into account the changed sizes of the control surfaces 28, 29, 38, so that the previously described function is maintained, namely that the piston 19 switches to its blocking position only when high pressure prevails in the high pressure line 9 and high pressure chamber, and at least the predetermined limit pressure in the consumer chamber at the end side.

As to the operation: External operating conditions permitting, it is easily possible to operate the consumer with the available medium pressure, without ever connecting the high pressure. At any rate, the check valve piston 19 always remains in its flow position because of the medium pressure P1 that is constantly present in the channel 36 and the corresponding valve chamber. On the other hand, an erroneous connection of the high pressure cannot occur. This can be, for example, of importance, when after a shutdown the high pressure switching valve is inadvertently actuated in a first step. Since in this case the medium pressure P1 is already applied to line 36, the valve remains in its flow position, in which the connection between the high pressure line 9 and the consumer line 5 is blocked. Instead, the connection to high pressure can occur only when either the consumer is under load to such an extent that the consumer pressure is greater than or equal to the limit pressure, or when by way of actuating the medium pressure control valve, the pressure buildup in the consumer has initially proceeded so far that the limit pressure, in the case of doubt this may be the medium pressure, is reached. Only then will actuating forces on the annular surfaces 29 and 38 suffice to overcome the actuating force on the annular surface 28 and to move the check valve piston 19 to its blocking position.

As a result, a connection is made between the high pressure line 9 and the consumer line 5 via the peripheral edge on control shoulder 31 (FIG. 2), or the radial bores 27 in the control shoulder 31. However, the connection between the consumer line 5 and the medium pressure line 7 is blocked. At the same time, the connection between the high pressure line 9 and the medium pressure line 7 is blocked.

Many modifications and other embodiments of the invention set forth herein will come to mind to one skilled in the art to which this invention pertains, having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A check valve arrangement for a hydraulic consumer which permits connecting a consumer line of the hydraulic consumer selectively to a medium pressure line or a high pressure line, said check valve arrangement comprising
    a check valve having a housing which is connected to at least one medium pressure line, a high pressure line, and the consumer line,
    a piston slideably mounted in said housing for selective movement between
        a flow position wherein the medium pressure line and the consumer line are connected and the connection between the high pressure line and the consumer line is blocked, and
        a blocking position wherein the connection between the medium pressure line and the consumer line is blocked and the connection between the high pressure line and the consumer line is opened, only when a predetermined hydraulic limit pressure is present in the consumer line,
    wherein the piston is constantly biased toward its flow position by the pressure in a second medium pressure line which is connected to the valve housing, and wherein the piston reaches its blocking position only under a pilot load provided by the high pressure line and an additional pilot load provided by said predetermined hydraulic limit pressure being present in the consumer line,
    wherein the piston has on its circumference two counteracting differential surfaces, with one of the surfaces communicating with the second medium pressure line, and with a second of the surfaces communicating with the high pressure line, and wherein the piston further includes a consumer pressure surface which communicates with the consumer line and is operative to bias the piston toward the blocking position.

2. The check valve arrangement of claim 1 wherein the predetermined hydraulic limit pressure is above atmospheric pressure.

3. The check valve arrangement of claim 1 wherein the predetermined hydraulic limit pressure substantially corresponds to the medium pressure.

4. The check valve arrangement of claim 1 wherein the consumer pressure surface and the second high pressure surface are dimensioned such that they act to switch the piston to the blocking position while overcoming the medium pressure acting on the one surface only when at least the predetermined hydraulic limit pressure is applied to the consumer pressure control surface.

5. The check valve arrangement of claim 4 further comprising a first switching valve for selectively connecting the first mentioned medium pressure line to a source of a fluid under medium pressure, and a second switching valve for selectively connecting the high pressure line to a source of fluid under a relatively high pressure.

6. A check valve arrangement for a hydraulic consumer and which permits connecting a consumer line of the hydraulic consumer selectively to a medium pressure line or a high pressure line, said check valve arrangement comprising
    a check valve having a housing which is connected to a first medium pressure line, a second medium pressure line, a high pressure line, and the consumer line,
    a piston slideably mounted in a bore of the check valve housing for slideable movement in the bore between a flow position and a blocking position,
    said piston being generally cylindrical and defining with the housing bore a first medium pressure chamber which communicates with the first medium pressure line, a second medium pressure chamber which communicates with the second medium pressure line, a valve chamber communicating with the high pressure line, a consumer chamber communicating with the consumer line, and a central bore extending along the length of the piston and interconnecting the first medium pressure chamber and the consumer chamber,
    said piston further including first and second oppositely directed annular surfaces communicating with the second medium pressure chamber and the valve chamber respectively, and a consumer pressure control surface facing in the same direction as said second annular surface and communicating with the consumer chamber,
    said valve housing including a seat opening formed between the first medium pressure line and the first medium pressure chamber, and said piston including a seat which engages and closes the seat opening and with the high pressure line being open to the consumer line, when the piston is moved to its blocking position, and when the piston is moved to its flow position the seat is separated from the seat opening and so that the first medium pressure line is open to the first medium pressure chamber and the high pressure line is closed to the consumer line, and
    wherein the first and second oppositely directed annular surfaces and the consumer pressure control surface are dimensioned such that the piston is moved to the flow position by the fluid from the second medium pressure line acting against the first annular surface in the second medium pressure chamber, and wherein the piston is moved to the blocking position only when a fluid at a predetermined hydraulic limit pressure is present in the consumer chamber and acts against the consumer pressure control surface.

7. The check valve arrangement of claim 6 further comprising a first switching valve for selectively connecting the first medium pressure line to a source of a fluid under medium pressure, and a second switching valve for selectively connecting the high pressure line to a source of fluid under a relatively high pressure.

8. The check valve arrangement of claim 7 wherein the second medium pressure line is continuously connected to a source of a fluid under medium pressure.

9. The check valve arrangement of claim 8 wherein the predetermined hydraulic limit pressure is above atmospheric pressure.

10. A check valve arrangement for a hydraulic consumer which permits connecting a consumer line of the hydraulic consumer selectively to a medium pressure line or a high pressure line, said check valve arrangement comprising a check valve having a housing which is connected to at least one medium pressure line, a high pressure line, and the consumer line, a piston slideably mounted in said housing for selective movement between a flow position wherein the medium pressure line and the consumer line are connected and the connection between the high pressure line and the consumer line is blocked, and a blocking position wherein the connection between the medium pressure line and the consumer line is blocked and the connection between the high pressure line and the consumer line is opened, and control means for selectively moving said piston between the flow position and the blocking position, and so that the piston is moved to the blocking position only when a predetermined hydraulic limit pressure is present in the consumer line, said control means comprising a first switching valve positioned in the one medium pressure line for selectively connecting the one medium pressure line to a medium pressure supply line, and a second switching valve positioned in the high pressure line for selectively connecting the high pressure line to a high pressure supply line.

11. The check valve of claim 10 wherein the first and second switching valves are operatively controlled by respective actuation members.

* * * * *